US007999535B2

United States Patent
Dietz et al.

(10) Patent No.: US 7,999,535 B2
(45) Date of Patent: Aug. 16, 2011

(54) MEASURING DEVICE FOR DETERMINING A POSITION BETWEEN A PRIMARY PART AND A SECONDARY PART BY MAGNETIC FLUX MEASUREMENTS

(75) Inventors: Ferdinand Dietz, Stuttgart (DE); Roland Finkler, Erlangen (DE); Paul Dünisch, Burglauer (DE); Rainer Siess, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 616 days.

(21) Appl. No.: 12/067,900

(22) PCT Filed: Aug. 30, 2006

(86) PCT No.: PCT/EP2006/065793
§ 371 (c)(1),
(2), (4) Date: Mar. 24, 2008

(87) PCT Pub. No.: WO2007/033888
PCT Pub. Date: Mar. 29, 2007

(65) Prior Publication Data
US 2008/0211436 A1    Sep. 4, 2008

(30) Foreign Application Priority Data
Sep. 22, 2005 (DE) .................. 10 2005 045 374

(51) Int. Cl.
*G01B 7/14* (2006.01)
*G01B 7/30* (2006.01)
(52) U.S. Cl. .......... 324/207.17; 324/207.2; 324/207.25; 324/207.24
(58) Field of Classification Search .................. None
See application file for complete search history.

(56) References Cited

U.S. PATENT DOCUMENTS

| | | | |
|---|---|---|---|
| 4,455,512 A | 6/1984 | Cornwell | |
| 4,509,001 A | 4/1985 | Terumichi | |
| 4,678,971 A | 7/1987 | Kanazawa | |
| 4,725,777 A * | 2/1988 | Tousch | 324/207.17 |
| 4,878,020 A * | 10/1989 | Karna et al. | 324/207.17 |
| 5,304,926 A * | 4/1994 | Wu | 324/207.2 |
| 5,434,504 A | 7/1995 | Hollis | |
| 5,444,368 A * | 8/1995 | Horber | 324/207.16 |
| 5,880,541 A | 3/1999 | Hinds | |
| 6,472,863 B1 * | 10/2002 | Garcia | 324/173 |

FOREIGN PATENT DOCUMENTS

| | | |
|---|---|---|
| DE | 22 65 207 A1 | 2/1977 |
| DE | 100 24 394 A1 | 11/2001 |
| DE | 101 63 504 A1 | 7/2003 |
| DE | 101 63 528 A1 | 7/2003 |
| DE | 103 29 150 A1 | 1/2005 |

* cited by examiner

*Primary Examiner* — Jay M Patidar
(74) *Attorney, Agent, or Firm* — Henry M. Feiereisen; Ursula B. Day

(57) ABSTRACT

The invention relates to a measuring apparatus comprising a sensing head (15) for determining the position of a primary part (27) on a secondary part. The sensing head (15) is fixedly connected to a primary part (27) or is integrated therein while the primary part (27) and the secondary part form a linear motor (30). Furthermore, the secondary part is embodied as a rack (16) which is provided at least with ferromagnetic material and preferably equidistant teeth (18) in a preferred direction (13), said teeth (18) containing at least ferromagnetic material. The sensing head (15) can be moved in the preferred direction (13) and opposite thereto. An air gap is located between the sensing head (15) and the rack (16) while the sensing head (15) is equipped with at least one sensor (1-12, 19, 31), by means of which magnetic fields can be measured in order to determine a position.

13 Claims, 9 Drawing Sheets

MEASURING DEVICE FOR DETERMINING A POSITION BETWEEN A PRIMARY PART AND A SECONDARY PART BY MAGNETIC FLUX MEASUREMENTS

BACKGROUND OF THE INVENTION

The invention relates to a measuring apparatus with a measuring head for determining the position of a primary part on a secondary part and to a method for determining the position of a primary part on a secondary part with a measuring head.

Electric motors are used in a very large number of technical fields. In the case of electric motors it is necessary to distinguish between DC motors, AC motors and three-phase motors. Electric motors can furthermore be split into rotary motors and linear motors. In order to approach a specific rotary angle in the case of rotary motors or specific path distances in the case of linear motors, it is necessary to measure the present rotary angle or the present path distance. In this case, the measurement should take place as precisely as possible in order that the corresponding rotary angle or the corresponding path distance can be approached precisely and quickly by means of a suitable regulating device.

Previous measurement systems for position determination for linear motors are based on an optical measurement, for example.

Disadvantages with an optical measurement, however, are the fact that it is expensive to implement and that the optical measurement is very easily impaired or made impossible by contamination in the linear motor or in its surrounding environment, so that failure of the regulating device results.

SUMMARY OF THE INVENTION

Against this background, the invention is based on the object of specifying a measuring head and a method for position determination for a linear motor, with which the costs are reduced in comparison with the previous optical solution and the reliability is increased in comparison with conventional solutions.

This object is achieved according to the invention by a measuring apparatus with a measuring head for determining the position of a primary part on a secondary part,
the measuring head being fixedly connected to a primary part or integrated in it,
the primary part and the secondary part forming a linear motor,
the secondary part being in the form of a toothed rack,
the toothed rack having at least ferromagnetic material and, in a preferred direction, having teeth with predeterminable spacings, which teeth have at least ferromagnetic material,
the measuring head being capable of moving in the preferred direction and at least in the opposite direction thereto,
an air gap being located between the measuring head and the toothed rack, and
the measuring head having at least one sensor, by means of which magnetic fields can be measured for the purpose of position determination.

Furthermore, the object is achieved by a linear motor according to the invention and by a method for determining the position of a primary part on a secondary part.

Advantageously, the costs in comparison with a previous optical solution for position determination are reduced by the measuring apparatus according to the invention with a measuring head. Furthermore, the reliability is markedly increased since contamination cannot result in the measurement being impaired in contrast to an optical solution.

The toothed rack can either correspond to the secondary part of the linear motor or else also in addition be installed in the linear motor for the purpose of position determination. In this case, the toothed rack is fitted in the vicinity of the movable part in the linear motor. The toothed rack is in this case, for example, constructed from laminates.

It is advantageous if the measuring head is fixedly connected to a primary part or is integrated in it and the primary part and the toothed rack form a linear motor and the toothed rack acts as the secondary part. That is to say that, in combination with a linear motor, the measuring apparatus according to the invention with a measuring head can be used in an advantageous manner by the measuring head being fixedly connected to the primary part of the linear motor and measuring the position of the primary part relative to the stationary secondary part. The measuring head according to the invention can in this case also be completely integrated in the primary part, with the result that it is even no longer possible to identify it as an independent object. In the latter case, the sensors are therefore installed directly in the primary part. It is therefore possible to design the unit comprising the primary part and the measuring head to be compact.

In this case, the teeth are preferably arranged equidistantly in a preferred direction on the toothed rack. However, the teeth can also have different spacings.

In a first configuration, the measuring head has at least two sensors, which can be used to detect magnetic fields, the sensors being arranged on the measuring head offset in the preferred direction of the toothed rack. Advantageously, improved position determination is therefore achieved in comparison with the case with only one sensor.

The measuring head has a position relative to the toothed rack in which the sensors are located either directly over the teeth of the toothed rack or next to the toothed rack at the height of the teeth. Alternatively, the sensors can also be shaped in such a way that they surround the teeth, but do not touch them.

The measuring apparatus according to the invention with a measuring head can be characterized by the fact that
at least one sensor has at least ferromagnetic material,
a sensor has at least two sensor heads, which are arranged so as to follow on from one another in the preferred direction of the toothed rack or in the preferred direction of the toothed rack parallel to one another and are connected to one another by a connecting element,
the connecting element and/or one or both sensor heads are also surrounded by an exciter coil, to which an excitation AC voltage can be applied,
the connecting element and/or one or both sensor heads is surrounded by a measuring coil, at which an induced voltage can be tapped off,
the air gap between the sensor and the toothed rack in the region of the connecting element is greater than in the region of the sensor heads, with the result that, when the excitation AC voltage is applied, the amplitudes of the induced voltage are increased if the sensor is located centrally over one tooth since in this case the magnetic circuit is closed over the tooth.

The induced voltage is therefore a measure of whether a sensor is located directly over a tooth, only partially overlaps it or is located over a tooth interspace. If the sensor is located over a tooth, the magnetic circuit over the tooth is closed, and the amplitudes of the induced voltage are at a maximum. In this embodiment, at least one AC voltage source, which provides the excitation AC voltage, is associated with the exciter coils. The air gap in the region of the connecting element can alternatively also correspond to that in the region of the sensor heads.

A further embodiment of the measuring apparatus according to the invention with a measuring head can be characterized by the fact that at least one sensor has at least ferromagnetic material,
a sensor has at least two sensor heads, which are arranged so as to follow on from one another in the preferred direction of the toothed rack or in the preferred direction of the toothed rack parallel to one another and are connected to one another by a connecting element, which has a measuring element for measuring the magnetic field, such as a magnetic dependent resistor or a Hall sensor,
the sensors and/or the teeth of the toothed rack have permanent magnets,
the air gap between the sensor and the toothed rack in the region of the connecting element is greater than in the region of the sensor heads.

The position of the sensor relative to the toothed rack can therefore be determined since the teeth and/or the sensors have permanent magnets, as a result of which, when the measuring head moves, the magnetic field in the sensor changes, which can be measured by a magnetic dependent resistor or a Hall sensor. The air gap in the region of the connecting element can alternatively also correspond to that in the region of the sensor heads. In this case, an electronic evaluation circuit is associated with the magnetic dependent resistors or the Hall sensors.

Advantageously, an electronic evaluation device, by means of which the position of the measuring head on the toothed rack can be determined from the measured values of the sensors, is associated with the measuring head. In this case, the measured values are in the form of induced or output voltages. During the determination of the position, use is made of the profile of the induced voltages or measured values as a function of the position of the measuring head on the toothed rack.

Furthermore, a correction device, which takes into consideration temperature-dependent changes in length of the toothed rack and/or shape or positional errors of individual teeth in the determination of the position of the measuring head, can be associated with the measuring head. Advantageously, precise determination of the position of the measuring head on the toothed rack is therefore also possible when the teeth have tolerances or the toothed rack has been lengthened or shortened as a result of a change in temperature. The temperature is measured by a temperature sensor. Tolerances of the teeth are measured before the linear motor is first brought into operation and stored in the correction device.

The position regulation and velocity regulation of the linear motor can be further improved in accordance with the teaching in the document DE10024394A1 by an acceleration and/or velocity sensor being associated with the measuring head.

Advantageously, an electrical circuit, in which at least one group of measuring coils or measuring elements is formed and the measuring coils of each group are connected either in parallel or in series, is associated with the measuring head. Alternatively, for each group the measuring coils, which follow on from one another in the preferred direction of the toothed rack, are connected with alternating polarity either in parallel or in series. The corresponding exciter coils are connected in parallel or in series. As a result of the interconnection in the form of a series or parallel circuit, there is advantageously only one voltage level, which needs to be evaluated in a downstream evaluation device. If the measuring coils, which follow on from one another in the preferred direction of the toothed rack, are connected with alternating polarity in series, the function of the envelopes of the induced voltage as a function of the position of the measuring head is similar to a sine function.

The advantages of the position determination on toothed racks are realized in particular in a linear motor according to the invention with a primary part and a secondary part, the secondary part being in the form of a toothed rack,
the toothed rack comprising at least a ferromagnetic material
and, in the preferred direction, having preferably equidistant teeth, which comprise at least ferromagnetic material,
the primary part being capable of being moved in the preferred direction and in the opposite direction thereto,
an air gap being located between the primary part and the toothed rack, and
the primary part having a measuring head according to the invention for position determination or a corresponding measuring head being integrated in the primary part in such a way that the two form one piece.

In this case, the toothed rack is therefore one component part, which is required for operating the linear motor and for operating the measuring head. That is to say that a further toothed rack is advantageously no longer required.

The invention can also be used in the case of a rotary motor. In this case, the toothed rack corresponds to the stator, which has teeth, and the primary part corresponds to the rotor. A variant according to the invention is also conceivable in which the toothed rack corresponds to the rotor and the primary part corresponds to the stator.

Furthermore, the measuring head can be used, for example, in a further type of linear motor, to be precise in permanent magnet synchronous motors, which have at least one secondary part, at least sections of which are free of permanent magnets. In this case, the primary part comprises a structure comprising toothed modules, which are arranged in the preferred direction, point towards the air gap and are each surrounded by a coil, each toothed module having at least one permanent magnet. In a particularly preferred embodiment, the secondary part is also configured completely without permanent magnets.

In the text which follows, supplementary embodiments and configurations relating to the measuring apparatus according to the invention with a measuring head and also to the method for position determination will be represented.

The measuring head according to the invention measures the present path position in the event of a path displacement of a cyclically split toothed rack or alternatively also of a magnet holder as a material measure.

A direct measurement system is required for the operation of linear motors. As a result of the force-fitting coupling between the direct measurement system and linear motors, a rigid position regulation response in the axial direction is provided. On the basis of previous experience, linear motor axles in the case of lightweight machines can be run with a high proportion of feedforward control. As a result, a narrow contour guidance of a tool driven by the linear motor is possible. Direct optical measurement systems for position determination are in this case relatively expensive.

A newly developed permanent magnet synchronous motor, which has at least one secondary part, at least sections of which are free of permanent magnets, no longer requires any permanent magnets in the secondary part. Instead, a structure similar to a toothed rack is used as the secondary part. The newly developed motor is a linear motor. This arrangement provides the opportunity of using novel, inexpensive measurement methods alongside a high resolution. In the explanations below, the term toothed rack is used for a material measure similar to a toothed rack, both for the secondary part of the newly developed motor and for the primary parts, which are provided with magnets, of the conventional linear motors.

The subject of the invention is, inter alia, the special arrangement of the individual sensors in the measuring head for detecting a position of the toothed rack. As a result, first a coarse geometric resolution of the toothed rack pitch is achieved prior to the electrical/digital fine resolution. This takes place by means of an array of staggered individual sensors.

The material measure of the sensor array in the position measuring head is at a specific pitch ratio with respect to the material measure of the toothed rack. In combination with the interpolation of the sensor signals, finally a resolution in the sub-mm range is achieved.

One feature of the proposed solution is the further resolution of the toothed rack pitch in a step sequence which preferably has an even number of steps. In this case, each step has an alternating polarity with respect to the next step, or an opposite electrically produced mathematical sign. Advantageously, the sensors are arranged in such a way that one sine or cosine period per toothed rack pitch results. Other subdivisions with a plurality of sine or cosine periods per toothed rack pitch are also conceivable.

On the one hand for displacement direction detection, and on the other hand for further electrical subdivision in the superordinate processor, a sine system and a cosine system, which is shifted through 90° with respect thereto, can be required in the measuring head.

The overall resolution is formed, inter alia, by the following chain:
  Module or toothed rack pitch.
  Number of sensors for the intermediate geometric resolution.
  Interpolation of the transmitter evaluation.

The solution provides the advantage that, in the basic scope, no additional optical or magnetic material measure in the form of a glass scale or a magnetic strip for the direct measurement system is required if a uniformly divided toothed rack is available. In the event of more stringent requirements, the solution can be combined with additional measurement systems.

The absolute and cyclic tolerance of the toothed rack can be corrected by means of a measurement system error correction in the superordinate processor system (CNC) by means of measurement and measure comparison with a comparison scale (laser interferometer).

Furthermore, the temperature-dependent length extent of the toothed rack can be corrected by an automatic temperature compensation in the superordinate processor system (CNC) if the temperature change is detected by a sensor.

In the case of a sensor which is based on induction, the highest amplitude is present in the case of complete coverage by the fed carrier frequency, and in the case of partial coverage the corresponding amplitude as a function of a cosinusoidal function of the path increment of the part-period. The minimum amplitude is present between two full overlaps. In order to achieve a cosine form which is as effective as possible, various measures can be taken, for example the shape of the sensor heads can be correspondingly optimized. The sensor array is arranged in such a way that, with a given displacement direction, in each case one negative half-cycle follows on from a positive half-cycle, and vice versa.

In the case of the inductive head, the changes in mathematical sign of the transmitter signals are achieved, for example, by virtue of the fact that the measuring coils are connected with different polarity in parallel or in series, while the exciter coils are all interconnected with the same polarity; alternatively, the exciter coils can be interconnected with different polarities and the measuring coils can be interconnected with the same polarity. Different polarities can therefore be achieved either by swapping over the terminals or by a different winding sense. In the case of a primary voltage which always has the same polarity, an identical phase angle, or one rotated through 180°, results depending on the polarity of the measuring coil, or vice versa. This solution has the advantage that no electronic active parts are required in the sensor head.

As a result of the technically simpler embodiment, only the series or parallel circuit comprising all the coil elements or individual sensors is described. Alternatively, the electrical individual detection of the sensor signals is also possible, with electronic overall evaluation in the superordinate electronics or processor assembly.

The arrangement of the sensors can be such that it covers or even overlaps the teeth.

The sensors according to the invention can be compared in terms of their physical operation with a transformer, which only induces the desired rated voltage in the secondary winding when the magnetic circuit is closed. This is the case when the position of the measuring head is such that the sensor heads of the relevant sensor are positioned in each case as centrally as possible over the teeth of the secondary part.

Depending on the linear displacement of the poles, in the case of a sinusoidal voltage on the exciter coils with a carrier frequency of conventionally 4 to 10 kHz and with a constant amplitude, a similar induced voltage results on the receiving coils, whose amplitude has a sinusoidal dependency on the displacement path. This amplitude is digitized. Independently of the evaluation method used, the evaluation electronics produce a position value with a correspondingly high resolution. As a result of a special arrangement and embodiment, the measuring head can also be used for path detection via material measures by means of permanent magnets.

Furthermore, coil parts or other structural elements of the primary or secondary part of the linear motor can also be used exclusively or partially for the function of the measurement method described.

Alternatively, the invention also relates to solutions in which a separately fitted toothed rack is used exclusively for path detection. This can also be a comb-like structure, which is inserted into the gaps between the teeth of the motor tooth system.

As an alternative to the described measuring apparatus with a measuring head, an inductosyn-like arrangement is also conceivable. In this case, the geometric step arrangement described is printed onto a printed circuit board with a magnetically conductive background. In the case of the toothed rack solution, a highly precise solution can also be used as the conventional inductosyn solution if the inductosyn slider is designed to overlap the teeth and the scales are pushed in the manner of a comb into the gaps between the teeth and adjusted.

When using a capacitive, optical or other measurement method, the gaps between the teeth can be used unchanged or for accommodating a special sensor mating piece. Likewise, the teeth can be used unchanged or for accommodating a special sensor mating piece. This also includes an additionally rastered fine subdivision of the gaps between the teeth and/or teeth in interaction with the path measuring head.

In order to use the proposed solution as a virtually absolute measurement system, corresponding additional markings/codings can be introduced along the toothed rack, which are also detected and evaluated by the measuring head; it is therefore then possible not only for the relative position within a toothed rack pitch but also the absolute position within the entire displacement path to be detected.

The described solution does not exclude the combination with another measurement system. It is advantageous to use the described solution possibly for commutation and for the velocity control loop, and to use a suitable additive measurement system for absolute positioning.

In addition to the proposed solution, the teeth of the toothed rack can additionally be provided with windings. These windings then in one case act as exciter coils, with the result that the measuring head sliding over them only needs to be available over the measuring coils, or in another case as measuring coils, with the result that the measuring head sliding over them only needs to be available over the exciter coils. The additional windings can in this case exclusively be used in the mentioned function or whilst also using another function.

The abovedescribed method can be used equally for rotary motors. In this case, the measuring head has a segment-like embodiment. Instead of a toothed rack, the material measure in this case comprises a wheel with inner toothing or a structure with a form similar to a wheel with permanent magnets or coil elements.

In addition to the case of two track signals which are shifted through 90°, in particular the case of three track signals is of interest. It is thus possible to compensate for, for example, a third harmonic of the track signals.

As described, a plurality of transmitter signal periods can be produced by the configuration of the measuring head per toothed rack period. However, it is also possible to produce further synthetic transmitter signals from the original transmitter signals, which synthetic transmitter signals have a plurality of signal periods per period of the original transmitter signals.

In arrangements in which magnetic dependent resistors are used, Hall sensors can in principle also be used. With magnetic dependent resistors, only the absolute value of the B field is measured, and with Hall sensors the mathematical sign is also measured.

The toothed rack can also be sampled based on the gearwheel transmitter principle. The difference from conventional gearwheel transmitters consists in two points:
  linear instead of round material measure
  more coarse structure (longer period length of the teeth) than is conventional in gearwheel transmitters.

In this case, the measuring head comprises a magnet and a magnetic field sensor. The magnetic field produced by the magnet is in this case influenced by a magnetic toothed structure which is located in front of the measuring head, with the result that the magnetic field sensor measures a different magnetic field depending on the relative position with respect to the toothed structure.

The sensor principles which have been described up to this point are based on the measurement of magnetic fields. However, other sensor principles are also conceivable. For example, the toothed rack can also be sampled optically or capacitively. Optical sampling, however, is not possible, for example, when the toothed rack (with an opaque material) is cast in such a way that the toothed rack structure cannot be optically identified from the outside.

Mere position measurement is only sufficient, under certain circumstances, for the positioning and position regulation, but not for velocity regulation with sufficient dynamics. This can be remedied in this case by acceleration or velocity sensors, with the aid of which an improved velocity signal can be obtained. In this case, in particular the Ferrari sensor should be mentioned, which measures the relative acceleration. For the advantages which can be achieved by the use of a Ferrari sensor, see DE10024394A1, for example. This document highlights the fact that an improved velocity/actual value signal can be obtained using the Ferrari sensor.

However, there are also two further points where the Ferrari sensor could be advantageous:
  The actual position measurement system has an error which also has a systematic content. This systematic content can be compensated for, under certain circumstances, at least partially by advance or online learning of the positional error curve.
  If the actual position measurement system has comparatively poor dynamics (a poor time response), this can be compensated for by the Ferrari sensor if the latter has correspondingly good dynamics.

Similar advantages to those associated with the Ferrari sensor are also conceivable with other acceleration or velocity sensors.

Advantages could also be provided by the additional application of a modified regulation method.

BRIEF DESCRIPTION OF THE DRAWING

The invention and further advantageous configurations of the invention in accordance with the features of the dependent claims are explained in more detail below with reference to schematically illustrated exemplary embodiments in the drawing, without the invention thereby being restricted to these exemplary embodiments; in the drawing:

DETAILED DESCRIPTION OF PREFERRED EMBODIMENTS

Figure 1:
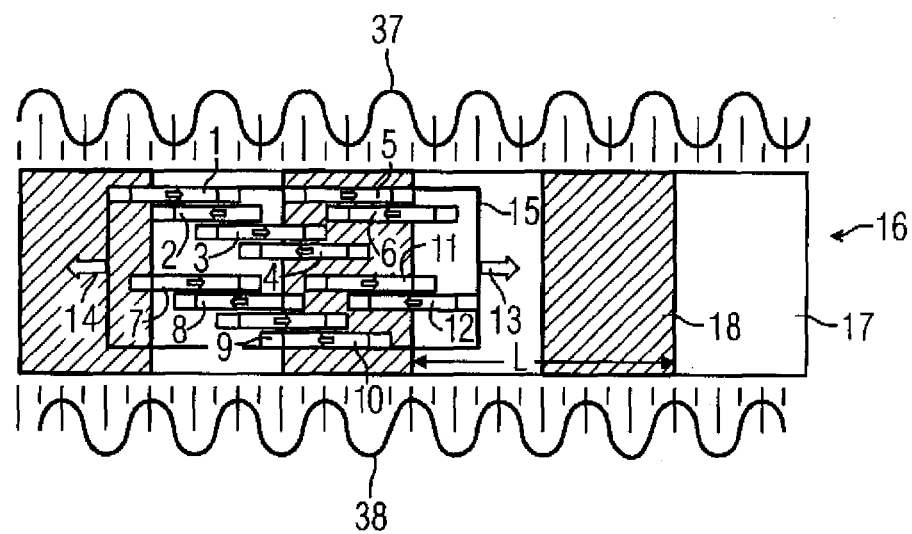
FIG. 1 shows a measuring head according to the invention on a toothed rack.

FIG. 1 shows a measuring head 15 according to the invention on a toothed rack 16 in plan view. The toothed rack 16 has teeth 18 and slots 17. The toothed rack pitch of the toothed rack 16 is L, i.e. the distance from tooth center to tooth center is L. The measuring head 15 is capable of moving in a first direction, also called "preferred direction" 13 of the toothed rack 16 or in a second opposite direction 14. The measuring head 15 has twelve sensors 1, 2, 3, 4, 5, 6, 7, 8, 9, 10, 11 and 12. The sensors 1 to 12 are in this case arranged offset with respect to one another in the preferred direction 13 of the toothed rack 16. The figure also shows the profile of the sinusoidal envelope 37 and the profile of the cosinusoidal envelope 38. The position of the measuring head 15 can be determined from the two profiles.

The toothed rack 16 and the teeth 18 are in this case manufactured at least from ferromagnetic material, but can also contain other materials. With the aid of the sensors 1 to 12, magnetic fields or changes in these magnetic fields can be measured. An air gap is located between the toothed rack 16 and the measuring head 15. The sensors 1 to 6 in this case form one group of sensors, and the sensors 7 to 12 form a further group of sensors. In the exemplary embodiment shown in FIG. 1, the sensors have a length which corresponds to the width of a tooth 18.

Figure 2:
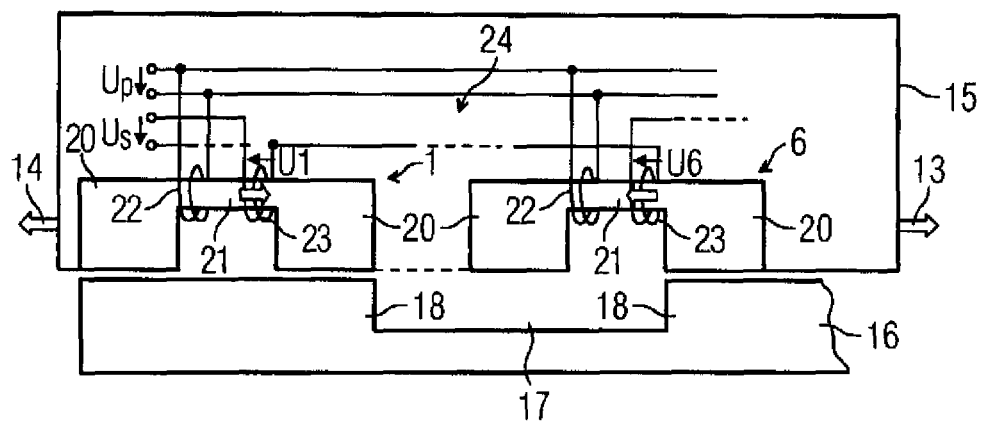
FIG. 2 shows a measuring head according to the invention with an associated electrical circuit.
Figure 11:
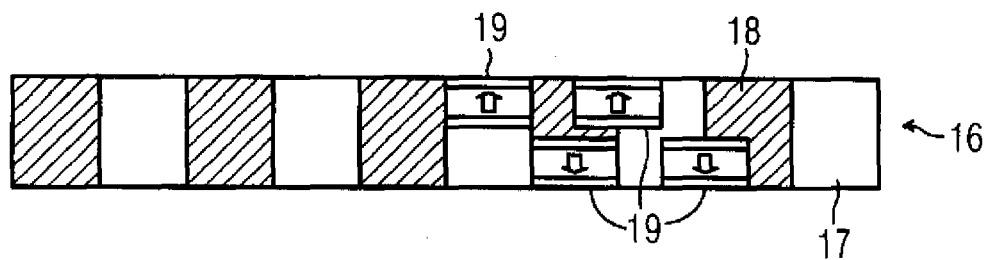
FIG. 11 shows a further arrangement of the sensors on a toothed rack.
Figure 12:
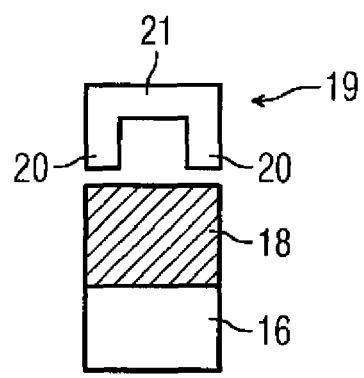
FIG. 12 shows an exemplary embodiment of a sensor from FIG. 11.
Figure 13:
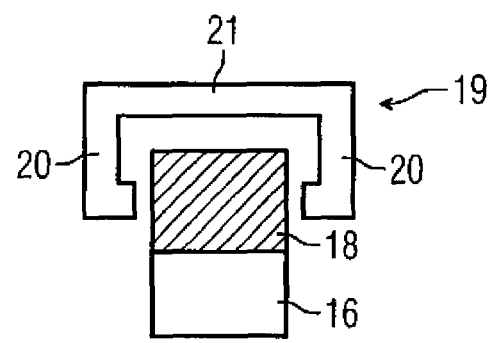
FIG. 13 shows a further exemplary embodiment of a sensor similar to that in FIG. 11.

FIG. 2 shows a measuring head 15 according to the invention with an associated electrical circuit 24 on a toothed rack 16. FIG. 2 shows, by way of example, the sensors 1 and 6. The sensors each have two sensor heads 20 and a connecting element 21 between the two sensor heads 20. The sensor heads 20 are arranged so as to follow on from one another in the preferred direction 13 or 14 of the toothed rack 16, but they can also be arranged parallel to one another in the preferred direction 13 or 14 of the toothed rack 16, as is shown in FIGS. 11, 12 and 13. The connecting element 21 is surrounded by an exciter coil 22, to which an excitation AC voltage Up is applied. Furthermore, the connecting elements 21 of the sensors 1 to 6 are surrounded by in each case one measuring coil 23, at which in each case one induced voltage U1, U2, U3, U4, U5 and U6, respectively, can be tapped off, only U1 and U6 being shown in FIG. 2. All of the exciter coils 22 and all of the measuring coils 23 are applied in the same way to the connecting element 21 and have the same winding sense.

In the example shown in FIG. 2, the measuring coils are connected in series. In this case, however, the measuring coil 23 of the sensor 6 is connected into the series circuit 24 with reverse polarity. This is denoted in FIG. 2 by an arrow in the measuring coil 23 of the sensor 6, which is in the opposite direction from the measuring coil 23 of the sensor 1. The voltage Us can be tapped off at the series circuit comprising the measuring coils 23 of the sensors 1 to 6. Alternatively, it is also conceivable for the voltages induced at the measuring coils 23 to be passed to a superordinate controller and evaluated there. The voltage Us is digitized for further processing purposes.

FIG. 2 furthermore shows the position measuring head with a three-fold reduction in the toothed rack pitch. In the event of movement in the displacement direction, three sine/cosine periods are produced in the case of three-fold reduction per toothed rack pitch or each toothed rack pitch is split into twelve individual steps or quadrants. In this case, the sensors 1 to 6 correspond to the sine system and the sensors 7 to 12 correspond to the cosine system. In this case, the sine system produces the profile 37 and the cosine system produces the profile 38.

The air gap between the sensors 1 to 12 and the toothed rack 16 in the region of the connecting element 21 is greater than in the region of the sensor heads 20, with the result that, when the excitation AC voltage Up is applied, for example, the amplitude of the induced voltage U1 is at a maximum if the sensor 1 is located centrally over a tooth 18, since the magnetic circuit is closed over the tooth 18. The sensors 1 to 12 are advantageously manufactured from at least ferromagnetic material, for this purpose.

Figure 3:
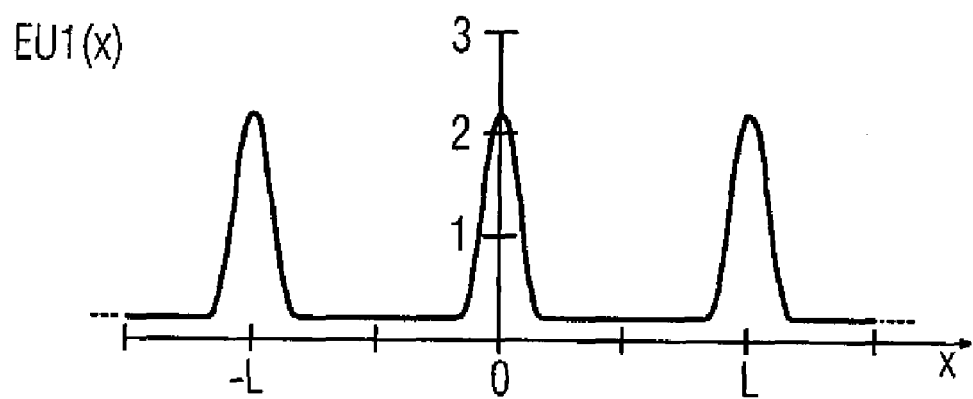
FIG. 3 shows the envelope of the induced voltage of sensor 1 in FIG. 2 as a function of the path distance x.

FIG. 3 shows the envelope of the induced voltage U1, denoted by EU1, of sensor 1 in FIG. 2 as a function of the path distance x along the preferred direction 13 of the toothed rack 16. If sensor 1 is located over a tooth 18 of the toothed rack 16, the envelope of the induced voltage U1 is at a maximum and falls to a minimum value if sensor 1 is located over a slot 17. As can be seen, position determination using only one sensor is made more difficult in particular when the latter is located over a slot 17.

Figure 4:
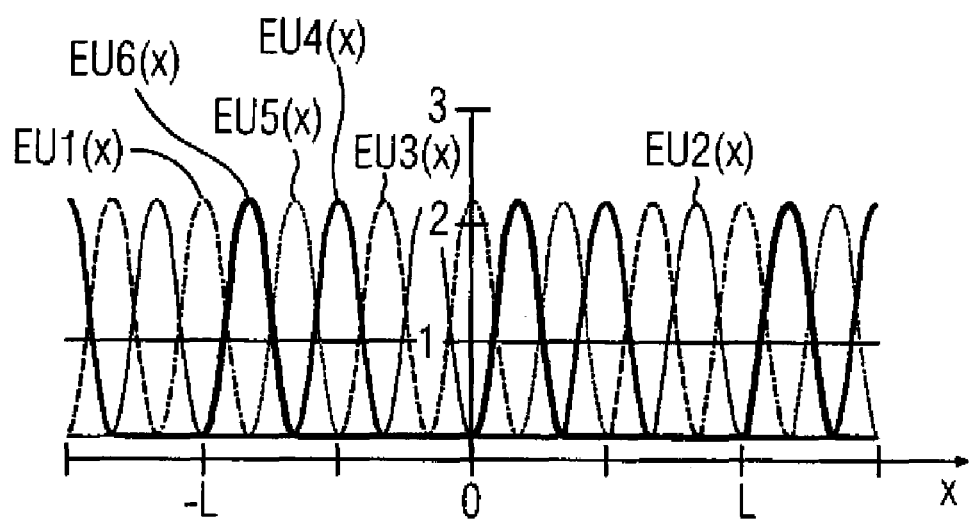
FIG. 4 shows the envelopes of the induced voltages of the sensors 1 to 6 in FIG. 2 as a function of the path distance x.

FIG. 4 shows the envelopes EU1(x) to EU6(x) of the induced voltages U1(1) to U6(x) of the sensors 1 to 6 from FIG. 2 as a function of the path distance x.

Figure 5:
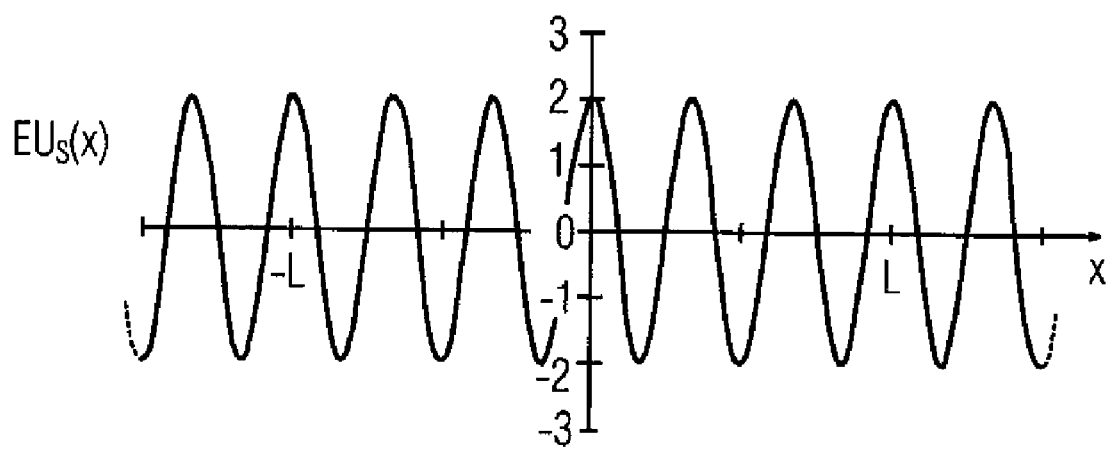
FIG. 5 shows the envelope of the voltage at the output of the electrical circuit from FIG. 2.

FIG. 5 shows the envelope EUs(x) of the voltage at the output of the electrical circuit Us(x) from FIG. 2. The voltages are combined in the series circuit correspondingly: Us(x)=U1(x)−U2(x)+U3(x)−U4(x)+U5(x)−U6(x). As can be seen in FIG. 5, a sinusoidal signal results, with the aid of which the position of the measuring head 15 can be determined. This would not yet have been possible from the signal U1(x) according to FIG. 3. Clear position determination within a toothed rack pitch is possible by virtue of the fact that the measuring coils 23 of the second group of sensors 7 to 12 are combined in a similar manner, with the result that a further phase-shifted sinusoidal voltage profile is produced.

A plurality of groups of sensors are also conceivable. In the case of two groups of sensors, a sinusoidal profile as a function of the path distance can be produced, for example, with a first group of sensors as shown in FIG. 5 and a cosinusoidal profile, i.e. a profile shifted through 90°, can be produced with a second group. Both of these profiles can be used to clearly determine the position of the measuring head within a toothed rack pitch. In particular, the second profile, which is shifted through 90°, can be used to identify in which direction the measuring head is moving.

It can be seen from FIG. 5 that, as a result of the convenient series circuit, a plurality of, in this case three, signal periods can be produced in the envelopes EUs(x) of Us(x) using the signal Us(x) per toothed rack pitch L.

The profiles of the amplitudes of the individual sensors can deviate from the ideal profile. These deviations can be described by offset, amplitude, phase and waveform errors. In this case, it needs to be assumed that these errors for the various individual sensors do not, or at least not in all cases, correspond to one another. Therefore, the profile of the signal Us will also have these errors, but sine periods following on from one another will generally have various errors. When using a track signal correction method, as is described, for example, in DE10163504A1 or DE10163528A1, this can be taken into consideration correspondingly.

The just mentioned waveform errors can be minimized by suitable shaping of the sensor heads 20. Preferably, the sensor heads 20 of the sensors 1 to 12 will in this case be correspondingly configured, but in principle the structure of the toothed rack 16 can also be correspondingly configured.

Figure 6:
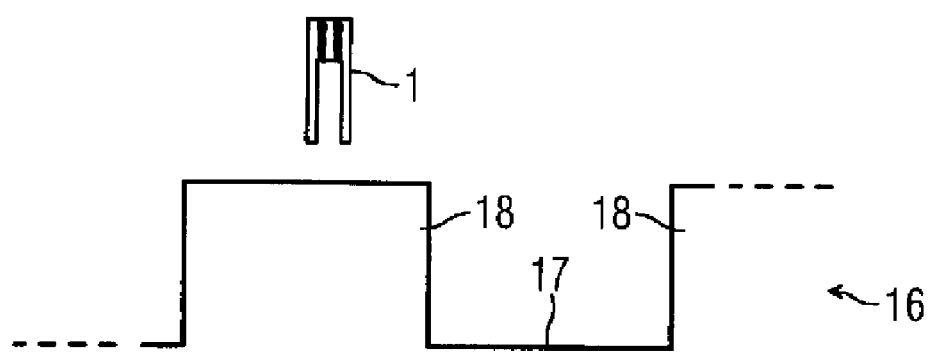
FIG. 6 shows a further sensor according to the invention on a toothed rack.

FIG. 6 shows a further sensor 1 according to the invention on a toothed rack 16. In this exemplary embodiment, the sensor 1 is shorter than the width of a tooth 18.

Figure 7:
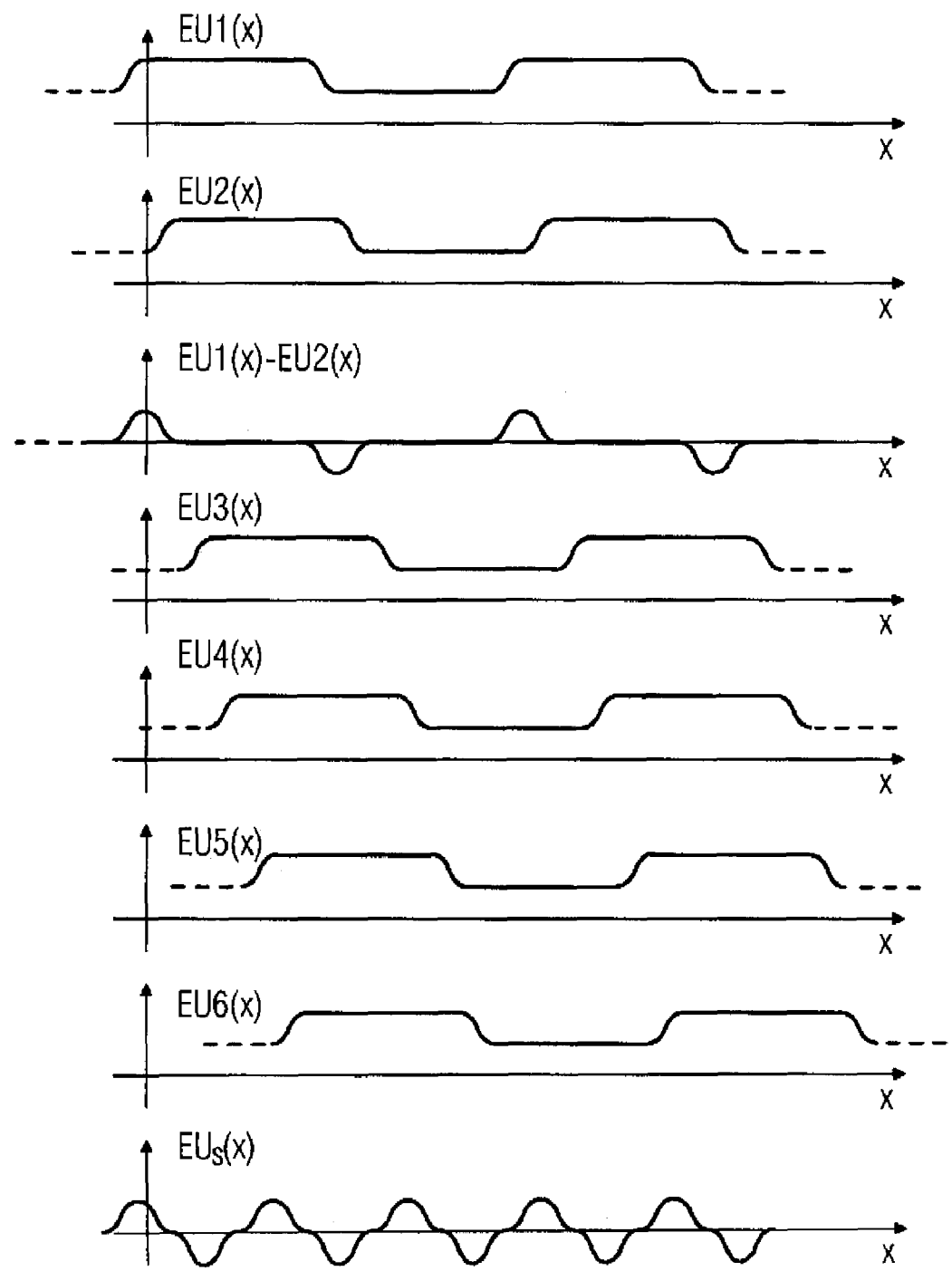
FIG. 7 shows the envelopes of the induced voltages of the sensors 1 to 6 corresponding to FIG. 6 as a function of the path distance x and the envelope of the voltage at the output of an electrical circuit.

FIG. 7 shows the envelopes $EU1(x)$ to $EU6(x)$ of the induced voltages $U1(x)$ to $U6(x)$ of the sensors 1 to 6 corresponding to FIG. 6 as a function of the path distance x and the envelope $EUs(x)$ of the voltage Us at the output of an electrical series circuit, in which the induced voltages are combined according to the formula $$Us(x)=U1(x)-U2(x)+U3(x)-U4(x)+U5(x)-U6(x).$$

In this example, a cyclic function results, from which the position of the measuring head 15 on the toothed rack 16 can be determined.

Figure 8:
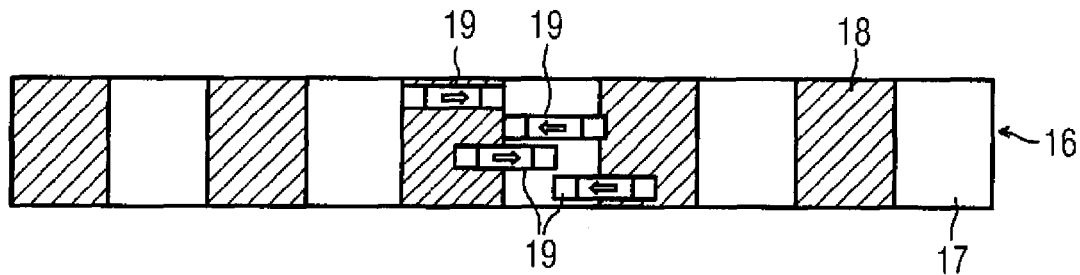
FIG. 8 shows a further measuring head according to the invention on a toothed rack.
Figure 9:
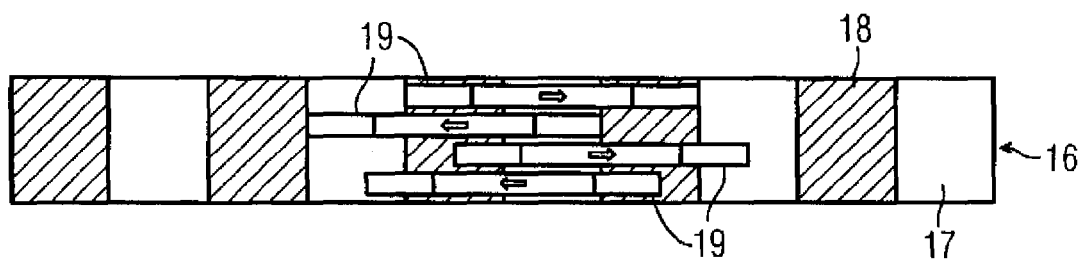
FIG. 9 shows a further measuring head according to the invention on a toothed rack.

FIGS. 8 and 9 show further measuring heads 15 according to the invention on a toothed rack 16. The sensors can in this case be as long, for example, as the width of a tooth 18 or else longer. The sensors are in this case arranged offset with respect to one another in the preferred direction 13 of the toothed rack 16. In this case, in each case the two sensors 19 which are illustrated at the top form one group of sensors and the two sensors which are illustrated at the bottom form a further group of sensors.

Figure 10:
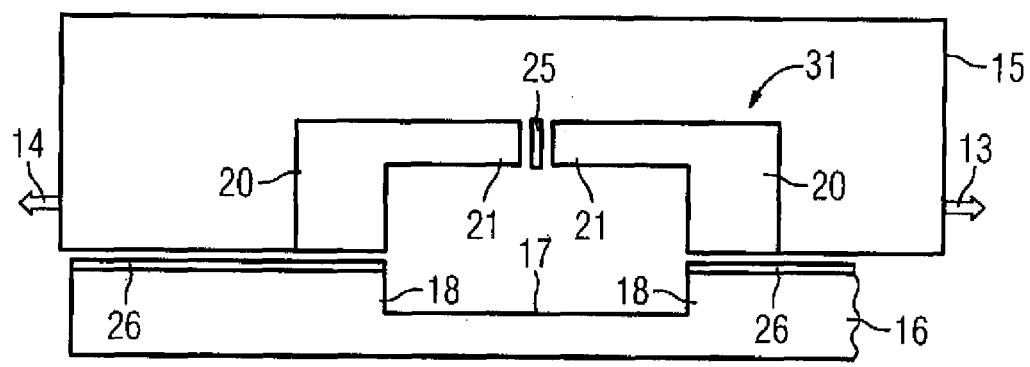
FIG. 10 shows a further measuring head according to the invention on a toothed rack with a further sensor according to the invention.

FIG. 10 shows a further measuring head 15 according to the invention on a toothed rack 16 with a further sensor 31 according to the invention. Sensor 31 comprises at least ferromagnetic material. Sensor 31 has at least two sensor heads 20, which are arranged so as to follow on from one another in the preferred direction 13 or 14 of the toothed rack 16. The sensor heads 20, however, can also be arranged parallel to one another in the preferred direction 13 or 14 of the toothed rack 16. The sensor heads 20 are connected to one another by a connecting element 21, which has a magnetic dependent resistor 25 or a Hall sensor for measuring the magnetic field. The sensor heads 20 and/or the teeth 18 of the toothed rack 16 have permanent magnets 26. The air gap between the sensor 31 and the toothed rack 16 in the region of the connecting element 21 is greater than in the region of the sensor heads 20.

If the sensor 31 is moved over the toothed rack 16, the change in the magnetic field is measured via the sensor heads 20 and the magnetic dependent resistor 25. This is used for determining the position of the measuring head 15. One advantageous factor is the fact that no excitation by means of an excitation AC voltage and no demodulation for transmitter evaluation needs to take place.

In the case of a measuring head with magnetic dependent resistors or Hall sensors, the changes in the mathematical sign of the transmitter signals are preferably achieved by virtue of the fact that the magnetic dependent resistors or Hall sensors are connected to an electronic circuit, which forms a suitable linear combination, such as addition and subtraction, for example, from the signals of the individual Hall sensors or magnetic dependent resistors.

FIG. 11 shows a further arrangement of the sensors 19 on a toothed rack 16. In this case, the sensors 19 can be designed corresponding to the sensors 1 to 12 or else 31. In the exemplary embodiment shown in FIG. 11, the sensor heads 20 are arranged parallel to one another in the preferred direction 13 or 14 of the toothed rack 16. In this case, the two sensors 19 illustrated on the left form one group of sensors and the two sensors illustrated on the right form a further group of sensors.

FIG. 12 and FIG. 13 show corresponding exemplary embodiments of the sensors 19. The sensor in FIG. 12 in this case corresponds to one of the sensors illustrated in FIG. 11. In FIG. 13, on the other hand, a slightly modified sensor is illustrated in comparison with the sensor in FIG. 12, namely the teeth 18 are surrounded laterally by the sensor heads 20 in this FIG. This has the advantage that a change in the spacing between the sensor 19 and the toothed rack 16 has less of an effect on the sensor signals than in the case of the sensor in FIG. 12.

Figure 14:
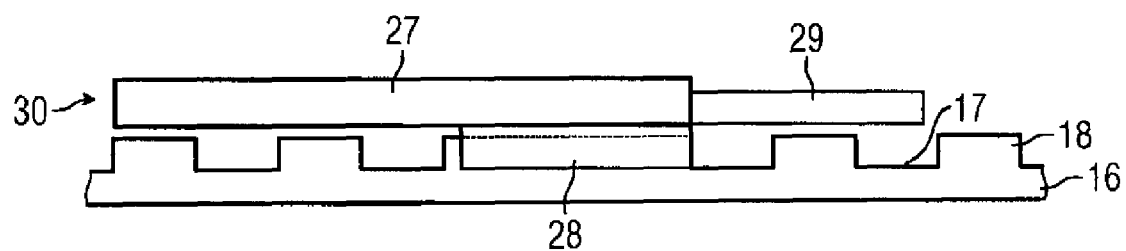
FIG. 14 shows a linear motor, on whose primary part a measuring head is fixed.
Figure 17:
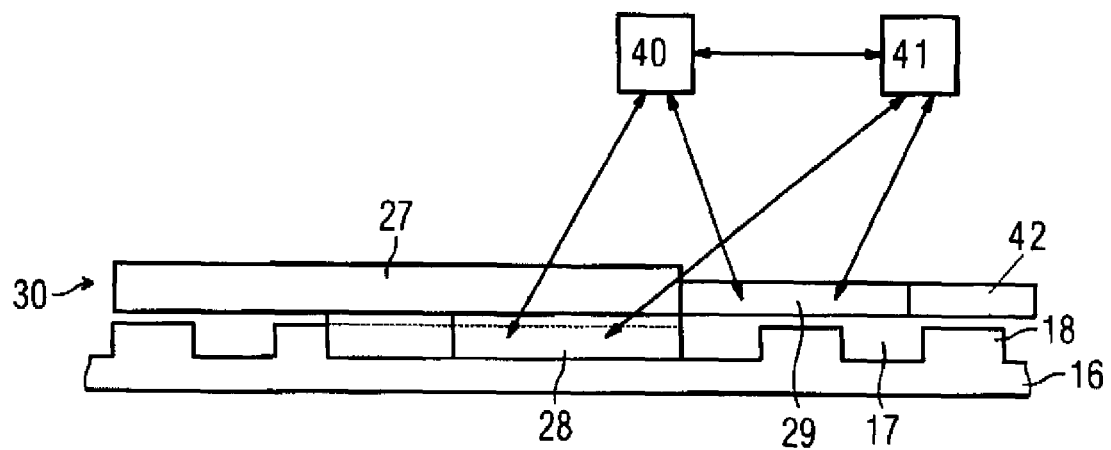
FIG. 17 shows the linear motor of FIG. 14 with evaluation device, correction device, and acceleration and/or velocity sensor.

FIG. 14 shows a linear motor 30, on whose primary part 27 a measuring head is fixed in position 29. As an alternative to this, the measuring head can also be fitted in position 28 on the primary part 27. By position 28, the movement path of the primary part is not restricted. Furthermore, the teeth 18 of the toothed rack 16 can have additional markings or codings which can be read, for example, optically or electromagnetically. The position of the measuring head 15 is therefore defined in particular when the linear motor 30 is switched on. The coding can be stored, for example, by means of RFID transponders. As shown in FIG. 17, at least one electronic evaluation device 40 is provided to determine the position of the measuring head on the toothed rack 16 in response to a measured value transmitted by the sensor. In addition, a correction device 41 is operatively connected to the measuring head to correct a determination of the position of the measuring head in response to a temperature-dependent change in length of the toothed rack 16, flaw in shape of individual teeth 18, or positional inaccuracy of individual teeth 18. FIG. 17 also shows the presence of an acceleration and/or velocity sensor 42 operatively connected with the measuring head.

A particularly advantageous embodiment is provided when the coding of the teeth 18 or segments of the toothed rack 16 can be programmed. This programming could take place during a setup run, in which the entire movement path is covered and an apparatus for programming is carried along with the primary part 27. The advantage here is the fact that it is thus easily possible to ensure that a clear conclusion can be drawn on the position from the readable code. It is therefore not necessary to take care, for example during the production of the segments, that no two segments are produced with identical codes.

Even if the segments cannot be programmed, but are provided with a fixed code in advance, the sequence of the code along the displacement path is under certain circumstances not known in advance. Thus, for example, a secondary part can comprise a plurality of secondary part sections, which for their part in turn in each case contain a plurality of segments. In this case, it is advantageous if it is not necessary to prescribe in which sequence the secondary part sections need to be arranged next to one another in a row. An already existing code sequence can also be changed if a secondary part needs to be replaced by a replacement part as a result of a defect. For this reason, it may be expedient to learn the code sequence first during a setup run.

Figure 15:
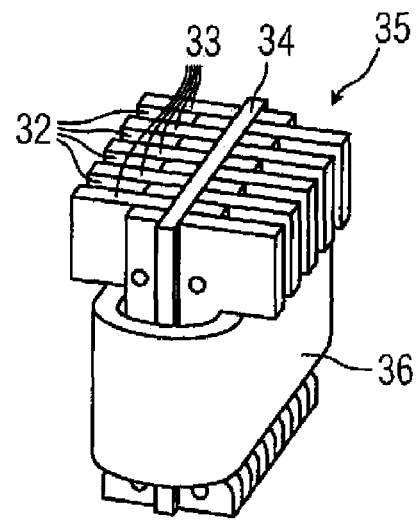
FIG. 15 shows a toothed module for a primary part of a permanent magnet synchronous motor.

FIG. 15 shows a toothed module 35 for a primary part of a permanent magnet synchronous linear motor, which has at least one secondary part, at least sections of which are free of permanent magnets. In this case, the primary part comprises a structure comprising toothed modules 35, which are arranged in the preferred direction, point towards the air gap and are in each case surrounded by a coil 36, each toothed module 35 having at least one permanent magnet 34. The secondary part (not illustrated here) is located in the position illustrated in FIG. 15 of the toothed module 35 beneath this toothed module 35. The exemplary toothed module has webs 33, which are separated from one another by interspaces 32. In this way, a plurality of toothed modules can be joined together to form a primary part. Instead of the webs 33, a solid basic body can also be used, however. Instead of the permanent magnet 34, permanent magnets can also be fitted on the underside of the toothed module 35.

Figure 16:
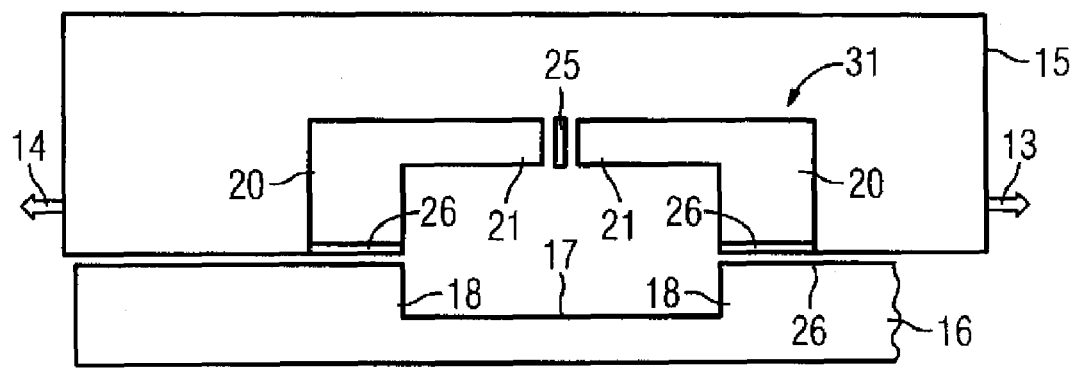
FIG. 16 shows a further measuring head according to the invention on a toothed rack with a further sensor according to the invention.

FIG. 16 shows a further measuring head 15 according to the invention on a toothed rack 16 with a further sensor 31 according to the invention. Sensor 31 comprises at least ferromagnetic material. Sensor 31 has at least two sensor heads 20, which are arranged so as to follow on from one another in the preferred direction 13 or 14 of the toothed rack 16. However, the sensor heads 20 can also be arranged parallel to one another in the preferred direction 13 or 14 of the toothed rack 16. The sensor heads 20 are connected to one another by a connecting element 21, which has a magnetic dependent resistor 25 or a Hall sensor for measuring the magnetic field. The sensor heads 20 have permanent magnets 26 on the side of the air gap. The air gap between the sensor 31 and the toothed rack 16 in the region of the connecting element 21 is greater than in the region of the sensor heads 20.

If the sensor 31 is moved over the toothed rack 16, the change in the magnetic field is measured via the sensor heads 20 with the permanent magnets 26 and the magnetic dependent resistor 25. This is used to determine the position of the measuring head 15. One advantageous factor is the fact that no excitation by means of an excitation AC voltage and no demodulation for the transmitter evaluation need to take place.

In the case of a measuring head with magnetic dependent resistors or Hall sensors, the changes in the mathematical signs of the transmitter signals are preferably achieved by virtue of the fact that the magnetic dependent resistors or Hall sensors are connected to an electronic circuit, which forms a suitable linear combination, such as addition and subtraction, for example, from the signals of the individual Hall sensors or magnetic dependent resistors.

What is claimed is:

1. A measuring device for determining a relative position between a primary part and a secondary part, comprising:
    a primary part comprising a measuring head which has at least one sensor having sensor heads arranged in a first direction with a first spacing and connected by a connecting element which includes a measuring element constructed to measure a magnetic flux through the connecting element; and
    a secondary part separated from the primary part by an air gap and constructed in the form of a toothed rack with teeth equidistantly spaced with a second spacing greater than the first spacing between sensor heads and arranged in the first direction and containing ferromagnetic material, wherein the primary part is movable in the first direction in relation to the toothed rack and in a second direction opposite to the first direction;
    wherein at least one of the primary part and the secondary part comprises at least one magnetic field generating element.

2. The measuring device of claim 1, wherein the measuring head has at least two sensors arranged on the measuring head side-by-side and with an offset in the first direction.

3. The measuring device of claim 2, wherein the sensors of the measuring head are placed above the teeth or next to the teeth.

4. The measuring device of claim 1, wherein the at least one sensor contains ferromagnetic material.

5. The measuring device of claim 1, wherein the measuring element comprises an exciter coil as the magnetic field generating element surrounding the connecting element and receiving an excitation AC voltage and a measuring coil surrounding the connecting element at which an induced voltage can be tapped off, and wherein the connecting element has a greater distance from the secondary part than a region of the sensor heads facing the secondary part so that amplitudes of the induced voltage, when the excitation AC voltage is applied, are increased when the sensor is located over one tooth of the toothed rack as a magnetic circuit is closed over the tooth of the secondary part.

6. The measuring device of claim 1, wherein the measuring element comprises a magnetic-flux-dependent resistor or a Hall sensor and the magnetic field generating element comprises at least one permanent magnet.

7. The measuring device of claim 5, further comprising at least one AC voltage source operatively connected with the exciter coil to provide the excitation AC voltage.

8. The measuring device of claim 1, further comprising at least one electronic evaluation device for determining the position of the measuring head in relation to the toothed rack in response to a measured value transmitted by the measuring element.

9. The measuring device of claim 1, further comprising a correction device operatively connected to the measuring head to correct a determination of the position of the measuring head in response to at least one factor selected from the group consisting of a temperature-dependent change in length of the toothed rack, flaw in shape of individual teeth, and positional inaccuracy of individual teeth.

10. The measuring device of claim 1, further comprising at least one of an acceleration and velocity sensor operatively connected with the measuring head.

11. The measuring device of claim 1, wherein the measurement head comprises a plurality of sensors having measuring elements, the measuring device comprising an electrical circuit including at least one group of said measuring elements, wherein the measuring elements of the group are connected either in parallel or in series.

12. The measuring device of claim 11, wherein the measuring elements of the group have different polarity.

13. A linear motor having a primary part and a secondary part separated from the primary part by an air gap and movable relative to the primary part in opposite first and second directions, the linear motor comprising measuring device for determining a relative position between the primary part and the secondary part, with the measuring device comprising:
    a measuring head disposed on the primary part, with at least one sensor having sensor heads arranged in a first direction with a first spacing and connected by a connecting element which includes a measuring element constructed to measure a magnetic flux through the connecting element; and
    the secondary part constructed in the form of a toothed rack with teeth equidistantly spaced with a second spacing greater than the first spacing between sensors and arranged in the first direction and containing ferromagnetic material;
    wherein at least one of the measuring head and the secondary part comprises at least one magnetic field generating element.

* * * * *